United States Patent
Larsen

[11] 3,859,680
[45] Jan. 14, 1975

[54] MARKER FOR USE IN FRESH AND SEA WATER

[76] Inventor: Abraham Larsen, 231 Evans Rd., Durban, South Africa

[22] Filed: July 12, 1973

[21] Appl. No.: 378,663

[30] Foreign Application Priority Data
July 14, 1972  South Africa.................. 72/4254

[52] U.S. Cl. .................................. 9/9, 116/124 B
[51] Int. Cl............................................ B63b 51/00
[58] Field of Search ............ 9/9; 116/124 B, 124 R, 116/107

[56] References Cited
UNITED STATES PATENTS

| | | | |
|---|---|---|---|
| 2,519,825 | 8/1950 | De Ment | 116/124 B |
| 2,669,211 | 2/1954 | Linck | 116/124 B |
| 2,675,776 | 4/1954 | Tuve | 116/124 B |
| 2,716,961 | 9/1955 | Manheim | 116/124 R |
| 3,049,091 | 8/1962 | Carroll et al | 9/9 |
| 3,170,438 | 2/1965 | Nadler et al. | 116/124 B |

Primary Examiner—Robert J. Spar
Assistant Examiner—Donald W. Underwood
Attorney, Agent, or Firm—Bierman & Bierman

[57] ABSTRACT

The invention is concerned with a buoyant marker comprising a charge of a water dispersable dye that is contained in a receptacle, the receptacle having at least one orifice through which the dye is dispersed, under operative conditions, at a determined rate.

6 Claims, 4 Drawing Figures

MARKER FOR USE IN FRESH AND SEA WATER

BACKGROUND OF INVENTION

This invention relates to a marker of the kind suitable for use at sea and on lakes, river and on like bodies of water.

Various markers have been proposed for use at sea. One arrangement, used particularly by spotter aircraft attached to a whaling station, comprises a packet of a water dispersable dye that is dropped in the area where a whale is sighted. The packet disintegrates as a result of which the dye quickly disperses in the water to provide a visible mark to which the following whalers are guided.

The arrangement suffers from the disadvantage that there is often a time lag after dropping the marker and before the pursuing whalers arrive in the area during which time the dye has dispersed sufficiently for it not to be easily visible.

BRIEF SUMMARY OF INVENTION

The present invention has as its object the provision of an improved form of such marker.

According to the invention, there is provided a marker adapted for use at sea and on rivers, lakes and the like bodies of water comprising flotation means, a charge of water dispersable dye and a receptacle adapted to contain the dye, the receptacle being provided with at least one discharge orifice through which the dye is adapted to be dispersed under operative conditions.

The term "water dispersable dye" is used in this specification in the sense in which includes substances that are taken up in water, either as a solution or as a suspension, for instance as a colloidal suspension, to colour the water.

In one form of the invention, the receptacle comprises an end sealed hollow cylinder in which the flotation means and the dye is contained. Preferably the flotation means comprises one or more discs formed from a synthetic resinous foam, the discs being located in diametrical planes of the cylinder and acting to divide the dye charge into layers. Ducts may be formed in the discs which ducts provide fluid communication between dye layers on each side of the discs. Such ducts therefore bring the dye layers successively into contact with the surrounding aqueous phase thereby allowing dispersion of the dye over a period longer than was possible in the known arrangements.

A discharge orifice may be provided at each end of the hollow cylinder. Preferably the cross sectional area of the one orifice is substantially different from the cross-sectional area of the other. These discharge orifices control the rate at which the dye is dispersed and through the provision of two discharge orifices of different diameter, a choice of three discharge rates is therefore possible. In a non-operative condition of the marker of orifices may be sealed with pressure sensitive tape.

Preferably the receptacle comprises a metal can.

In another form of the invention, the receptacle and the flotation means is provided by a synthetic resinous foam in which the dye is mixed.

BRIEF DESCRIPTION OF SEVERAL VIEWS OF DRAWINGS

By way of example, preferred embodiments of the invention will now be described with reference to the accompanying drawings in which:

FIG. 3 is a plan view also seen from the top, of this embodiment of the marker, while

DETAILED DESCRIPTION

The marker comprises a receptacle in the form of a metal can 1 of conventional 500 gram format. These cans are well known in the canning industry and generally comprise a hollow cylindrical portion that is end sealed with discs 2.

Each of the discs 2 is provided with a discharge orifice 3 that is rectangular in cross section. From FIGS. 3 and 4 it will be seen that one discharge orifice is approximately twice the cross sectional area of the other discharge orifice.

Figure 1:
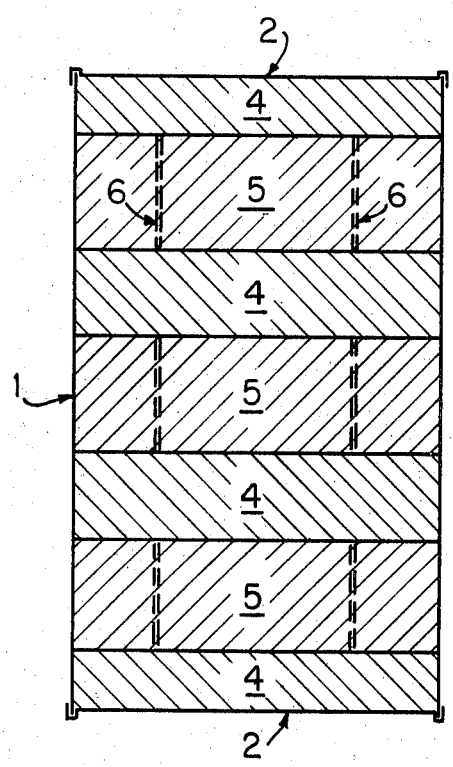
FIG. 1 is a section through one embodiment of the marker.
Figure 2:
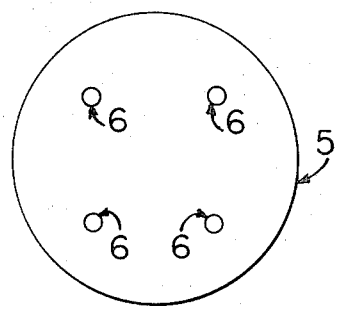
FIG. 2 is a plan view of a float forming part of this embodiment of the marker.

The can contains layers 4 of fluorescein dye provided in powder form. Each of these layers 4 is interspaced with a float 5 manufactured from a suitable synthetic resinous foam. From FIG. 2 it will be seen that these floats 5 are circular when viewed in plan and are located, in a snug fit, in a diametrical plane of the can 1. The floats 5 are provided with four symetrically placed ducts 6 which pass through the float. When in position, the ducts 6 therefore provide fluid communication between layers of dye on each side of the float 5.

It has been found that the requirements of buoyancy and a long effective life can both be satisfied if the dye volume and the combined volume of the floats are approximately the same.

Figure 3:
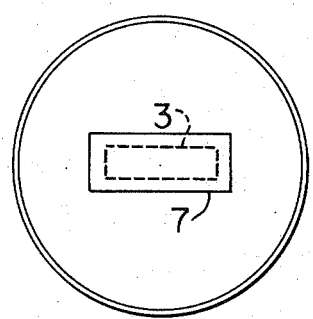
Figure 4:
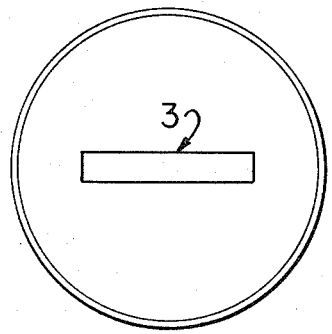
FIG. 4 is a plan view, when viewed from the bottom of this embodiment of the marker.

When not in use, the dye in the can is protected against deterioration by sealing the orifices with a strip of pressure sensitive adhesive tape, for instance "masking" tape as shown in FIG. 3.

In use, the pressure sensitive adhesive tape 7 is pulled off one of the orifices 3 depending on the effective life required of the marker. Clearly if the marker is required to be effective over a short interval of time, or is to be used in rough conditions, the strip is removed from the larger orifice or even both orifices while the strip is removed from the smaller orifice if the marker is required to remain effective over a longer period of time.

The marker is then dropped into the sea. Immediately contact is made between the water and the dye, the dye starts dissolving until the ducts in the first float are exposed. Thereafter the second dye layer starts dissolving and so on until the last layer at the bottom of the tin has dissolved and dispersed into the sea. It will be appreciated that because of the arrangement of the larger orifices 3 in the sealing discs 2 and the smaller ducts 6 in the floats 5, the first dye layer dissolved quickly to provide a rapid build-up of colour, and thereafter there is a progressive decrease in the rate at which the dye dissolves as the distance of the dissolving dye from the orifice 3 increases. This decrease compensates for colour loss as the coloured area increases due to the movement of the water. In this way, it has been found that a marker can be provided which remains effective over as long as seven to eight hours.

In another form of the invention not shown in the accompanying drawings, the marker comprises a fluorescein dye in particulate form which is dispersed in a suitable open cell synthetic resinous foam. In this case, the dye particles are admixed with a synthetic resin which is then extruded as a rod, cured to provide an open cell foam and cut up into suitable lengths. If necessary, the cut lengths can be wrapped to prevent deterioration of the dye or the foam can be extruded into a plastic sleeve.

In this form of the invention, it will be appreciated that the foam cells which are open to the atmosphere provide the orifices of the previous example while the foam or sleeve constitutes the receptacle in which the dye particles are contained.

It will be appreciated that in this form of the invention the degree to which the resin is foamed and the volume of the marker, that is the length and diameter of the rod, together determine the effective life of the marker. Unlike the previously described embodiment of the invention, the marker in this form of the invention has a specific effective life which cannot be varied. For this reason, the marker can be provided in rod lengths which are cut on site according to the effective life required of the marker.

Many other forms of the invention exist. Thus cans of larger or smaller format may be used depending on circumstances. Receptacles in the form of small canisters may be provided which can be attached to life buoys and jackets. In this case the sealed canister may be provided with a tear strip adapted to open up the orifice. Water dispersable dyes other than fluorescein may be used and the invention is therefore not intended to be limited to use of this particular dye. The floats may be made from a natural material such as cork and may also be comminuted and packed in layers thus allowing for use of scrap material. Instead of using fluorescein powder in the case of the first described embodiments cakes of dye substantially similar in shape to the floats may be used.

The flotation means may be provided outside the receptacle, for instance as a separate float or as a buoyant sheath located round the canister of the first described embodiment. In this case, the layers of dye may be separated by spacers manufactured, for instance, from a metal foil. The flotation means may also comprise airlocked compartments provided between the dye layers.

In another form of the invention, the dye is not provided in layers but is intermixed with the flotation means, which may be communinuted cork, foam or the like.

The invention provides a marker which can be manufactured easily and economically and which not only has a life that can be regulated according to conditions but which also ensures a longer life than has been achieved in the known arrangement using the same quantity of dye.

I claim:

1. A marker adapted for use at sea and on lakes, rivers and the like bodies of water comprising a charge of a water dispersable dye located in at least two layers, the layers being separated from each other by flotation means having ducts which communicate between the dye layers on each side of the flotation means and an end sealed hollow cylinder adapted to contain the dye and the flotation means, the cylinder being provided with at least one discharge orifice through which the dye is adapted to be dispersed under operative conditions.

2. A marker as claimed in claim 1 in which an orifice is provided in each end of the cylinder, the one orifice having a cross sectional area approximately twice the cross sectional area of the other orifice.

3. A marker as claimed in claim 1 in which the flotation means comprises at least one disc adapted to fit in a diametrical plane of the cylinder.

4. A marker as claimed in claim 2 in which the orifices are sealed in a non operative condition of the marker, with the pressure sensitive adhesive tape.

5. A marker for use at sea and on lakes, rivers and the like bodies of water comprising flotation means, a charge of a water dispersable dye and a receptacle adapted to contain the dye, said flotation means being contained within said receptacle, the dye being located in at least two layers separated from each other by the said flotation means, at least one duct in said flotation means for communicating with said layers, said receptacle having at least one discharge orifice therein through which the dye is dispersed under operative conditions.

6. A marker according to claim 5 wherein said receptacle entirely enclosed said layers except at said discharge orifice.

* * * * *